(12) United States Patent
Lopez et al.

(10) Patent No.: US 11,996,683 B2
(45) Date of Patent: May 28, 2024

(54) COMPRESSIBLE CONDULET DEVICES, ASSEMBLIES, SYSTEMS AND METHODS FOR ELECTRICAL RACEWAY FABRICATION

(71) Applicant: EATON INTELLIGENT POWER LIMITED, Dublin (IE)

(72) Inventors: Joseph Vincent Lopez, Camillus, NY (US); Himanshu Gangadhar Khokle, Maharashtra (IN); Andrew F. Scarlata, West Monroe, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 91 days.

(21) Appl. No.: 17/502,959

(22) Filed: Oct. 15, 2021

(65) Prior Publication Data

US 2022/0123537 A1     Apr. 21, 2022

Related U.S. Application Data

(60) Provisional application No. 63/093,575, filed on Oct. 19, 2020.

(51) Int. Cl.
*H02G 3/06* (2006.01)
*H02G 3/22* (2006.01)
*H02G 9/06* (2006.01)

(52) U.S. Cl.
CPC ............. *H02G 3/0616* (2013.01); *H02G 3/22* (2013.01); *H02G 9/06* (2013.01)

(58) Field of Classification Search
CPC .... H02G 1/085; H02G 3/0406; H02G 3/0481; H02G 3/083; H02G 3/22; H02G 3/26;
(Continued)

(56) References Cited

U.S. PATENT DOCUMENTS 1,822,056 A  *  9/1931  Noble ................... H02G 3/065
                                                  285/179
2,158,757 A     5/1939  Kuestermeier
(Continued)

FOREIGN PATENT DOCUMENTS

CN      108087647 A    5/2018
DE       20300918 U1    3/2003

OTHER PUBLICATIONS

PCT International Search Report and Written Opinion, Application No. PCT/EP2020/025196, dated Jul. 6, 2020, 14 pgs.
(Continued)

*Primary Examiner* — Timothy J Thompson
*Assistant Examiner* — Rhadames Alonzo Miller
(74) *Attorney, Agent, or Firm* — Squire Patton Boggs (US) LLP

(57) ABSTRACT

A condulet assembly for fabricating a rigid or intermediate metal conduit raceway of an electrical system is provided. The condulet assembly includes a gasket and a condulet including a condulet body and a mouth with an interior ridge positioned circumferentially along an interior of the mouth wall. The interior ridge includes a plurality of projections configured to form a plurality of indentations circumferentially around an exterior of the metal conduit and engage the metal conduit at the indentations when the mouth is compressed with the metal conduit received therein. The gasket is sized to circumscribe the conduit and includes a ring body and a first lip, wherein the ring body and the first lip deform and seal a gap between the interior of the mouth wall and the exterior of the metal conduit when the mouth is compressed with the metal conduit received therein.

23 Claims, 15 Drawing Sheets

(58) Field of Classification Search
CPC ......... H02G 9/06; F16L 13/142; B25B 27/10; B21D 39/046
See application file for complete search history.

(56) References Cited

U.S. PATENT DOCUMENTS

| | | | |
|---|---|---|---|
| 3,486,774 A | 12/1969 | Corey | |
| 4,836,580 A * | 6/1989 | Farrell | F16L 37/0985 285/133.11 |
| 5,029,908 A * | 7/1991 | Belisaire | F16L 37/0982 285/323 |
| 5,803,512 A * | 9/1998 | Hollnagel | F16L 37/084 285/424 |
| 6,199,920 B1 * | 3/2001 | Neustadtl | F16L 37/0985 285/903 |
| 6,694,586 B1 | 2/2004 | Goop | |
| 6,729,009 B2 | 5/2004 | Goop | |
| 6,843,096 B2 | 1/2005 | Viegener et al. | |
| 7,146,839 B2 | 12/2006 | Goop | |
| 7,201,382 B2 * | 4/2007 | Viegener | F16L 37/0845 277/611 |
| 7,237,427 B2 | 7/2007 | Viegener | |
| 7,316,429 B2 * | 1/2008 | Viegener | F16L 37/091 285/307 |
| 7,481,462 B2 * | 1/2009 | Arning | F16L 5/027 285/414 |
| 7,484,398 B2 | 2/2009 | Hofmann | |
| 7,587,924 B2 * | 9/2009 | Viegener | B21K 1/16 285/382.4 |
| 7,658,419 B2 | 2/2010 | Viegener et al. | |
| 7,845,371 B2 | 12/2010 | Hartung | |
| 7,980,600 B2 * | 7/2011 | Hofmann | F16L 37/12 285/322 |
| 8,025,315 B2 * | 9/2011 | Schreckenberg | F16L 13/142 285/248 |
| 8,042,841 B2 | 10/2011 | Viegener | |
| 8,262,138 B2 * | 9/2012 | Rischen | F16L 13/146 285/323 |
| 8,480,134 B2 * | 7/2013 | Crompton | F16L 37/0915 29/521 |
| 8,495,782 B2 | 7/2013 | Franke et al. | |
| 8,517,431 B2 * | 8/2013 | Arning | F16L 13/141 285/256 |
| 8,567,034 B2 | 10/2013 | Hofmann et al. | |
| 8,578,751 B2 | 11/2013 | Hofmann | |
| 8,745,843 B2 | 6/2014 | Michels et al. | |
| 8,770,230 B2 | 7/2014 | Steinhanses et al. | |
| 9,004,541 B2 | 4/2015 | Sinoplu et al. | |
| 9,109,724 B2 | 8/2015 | Meissner et al. | |
| 9,234,611 B2 | 1/2016 | Arning et al. | |
| 9,249,907 B2 * | 2/2016 | Mester | F16L 13/142 |
| 9,334,987 B2 | 5/2016 | Hofmann | |
| 9,551,445 B2 | 1/2017 | Morse et al. | |
| 9,599,266 B2 | 3/2017 | Schreckenberg et al. | |
| 9,601,914 B2 | 3/2017 | Chiu | |
| 9,920,865 B2 | 3/2018 | Schroeder et al. | |
| 10,001,230 B2 | 6/2018 | Rischen et al. | |
| 10,330,231 B2 | 6/2019 | Meissner | |
| 10,359,132 B2 | 7/2019 | Hartmann et al. | |
| 2003/0038481 A1 * | 2/2003 | Viegener | F16L 37/091 285/104 |
| 2011/0049875 A1 * | 3/2011 | Stults | F16L 13/142 285/345 |
| 2012/0161438 A1 * | 6/2012 | Rischen | F16L 13/142 285/382 |
| 2015/0354738 A1 * | 12/2015 | Morse | H02G 15/013 285/39 |
| 2017/0030489 A1 | 2/2017 | DeCesare et al. | |
| 2017/0356576 A1 * | 12/2017 | Shemtov | F16L 19/07 |
| 2019/0067922 A1 * | 2/2019 | Platt | F16L 37/091 |
| 2019/0288494 A1 * | 9/2019 | Morse | H02G 3/0481 |
| 2020/0248853 A1 * | 8/2020 | Kimura | H02G 9/10 |

OTHER PUBLICATIONS

Extended European Search Report for European Application No. 21203569.5 dated Feb. 23, 2022, 9 pages.

* cited by examiner

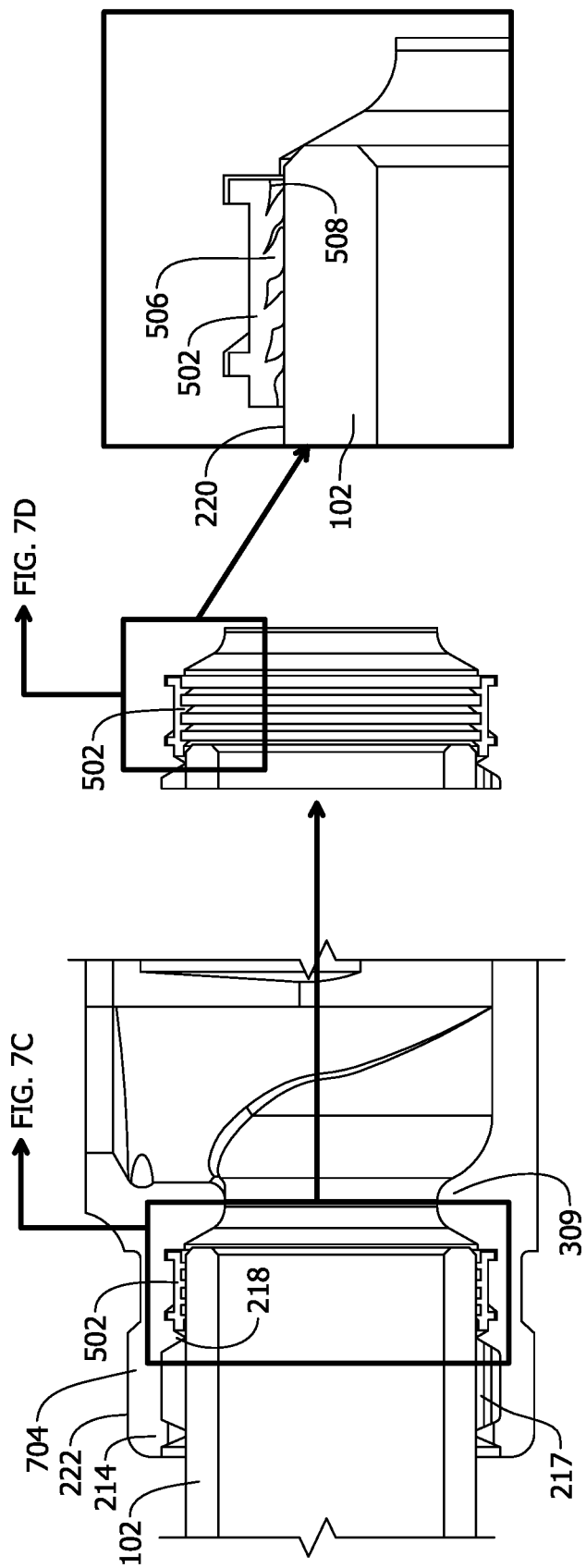

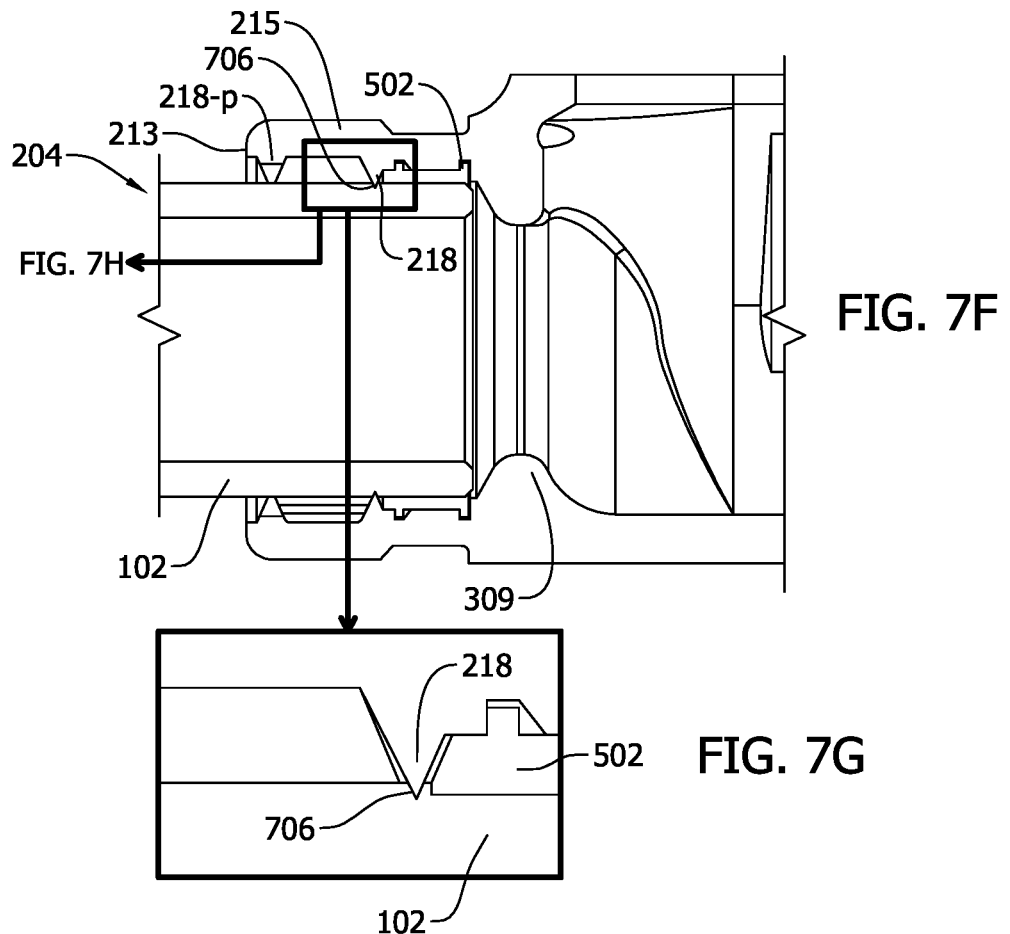
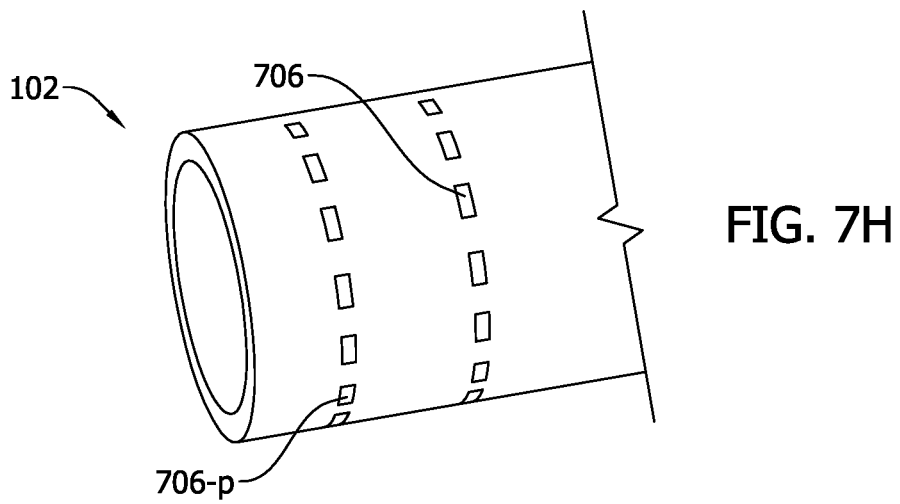

COMPRESSIBLE CONDULET DEVICES, ASSEMBLIES, SYSTEMS AND METHODS FOR ELECTRICAL RACEWAY FABRICATION

CROSS REFERENCE TO RELATED APPLICATIONS

This application claims the benefit of U.S. Provisional Application No. 63/093,575 filed Oct. 19, 2020, the entire contents and disclosure of which are hereby incorporated by reference herein by their entirety.

BACKGROUND

The field of the disclosure relates generally to raceways for electrical systems, and more particularly to compressible condulet assemblies for interconnecting electrical conduits.

Rigid Metal Conduit (RMC) and Intermediate Metal Conduit (IMC) raceways are often used to carry and protect electrical wiring or cabling in an electrical system of an industrial facility, such as gas stations, refineries, and power plants. Conventional RMC and IMC raceways are constructed by coupling lengths of threaded RMC or IMC conduits together with threaded couplers. Couplers may also be referred to as condulets, condulet fittings, outlet boxes, or hubs. Condulets also provide access points to the wires to assist in pulling wires through the conduit raceway system over large distances. Condulets are known to effect a change in the direction of a conduit and cabling in an RMC raceway.

While known condulets are effective in providing desired interconnections of conduits, they are laborious to install and prone to certain problems, and improvements are desired.

BRIEF DESCRIPTION OF THE DRAWINGS

Non-limiting and non-exhaustive embodiments are described with reference to the following figures, wherein like reference numerals refer to like parts throughout the various drawings unless otherwise specified.

FIGS. 7A-7H are schematic diagrams illustrating the method shown in FIG. 6.

FIG. 7A shows a conduit and an exemplary condulet assembly before the conduit being fully inserted into the condulet assembly.

FIG. 7B shows the conduit and the condulet assembly shown in FIG. 7A after the conduit being fully inserted into the condulet assembly.

FIG. 7C is an enlarged view of the conduit and the condulet assembly shown in FIG. 7B.

FIG. 7D is a further-enlarged view of the conduit and the condulet assembly shown in FIG. 7B.

FIG. 7E shows that a press tool is placed around the condulet assembly shown in FIG. 7B.

FIG. 7F is a partial cross-sectional view of an exemplary raceway after a compression force has applied.

FIG. 7G is an enlarged view of the raceway shown in FIG. 7F.

FIG. 7H is a partial view of the conduit of the raceway shown in FIG. 7F.

DETAILED DESCRIPTION

Conventional condulets provide interconnection of metal conduits such as rigid or intermediate metal conduits in fabrication of a wire or cable raceway for an electrical system. Threaded attachment of rigid metal conduits to one another and to threaded condulets is conventionally performed in the fabrication of raceways, but is sub-optimal in some aspects.

For example, when a length of threaded conduit exceeds a length needed for a given installation, the conduit is cut and new threads are typically formed on the remaining unthreaded end after cutting such that the conduit can still be coupled to a threaded condulet. However, forming new threads on the cut conduit can be time-consuming, dangerous, and laborious, thus increasing the cost, risk, and time to construct a raceway. Moreover, forming threads on an end of a conduit that has been cut without creating imperfections (e.g., an angled end of the conduit, or burrs and the like on the inside or outside of the conduit) in the connections requires a level of skill that the average worker may or may not possess. Burrs and the like may damage the insulation of electrical wires or cables being pulled through the conduit and/or the threaded connection between the conduit and the condulet, resulting in undesirable reliability issues.

Further, threading machines are large and expensive, and require time to set up and tear down. The machines are often located away from the primary work area, resulting in lost time in transporting materials to and from the threading machines. Moreover, the threading machines use sharp steel tools and cutting oil for forming threads, safety and clean-up issues also need to be addressed.

Systems and methods described herein allow fabrication of raceways without creation of threads on conduits. Conduits are coupled to a condulet assembly through indentations formed in the conduits by an interior ridge of the condulet assembly when a compression force is applied. Sealing of the raceway is provided by a gasket having lips. The assemblies, systems, and methods meet longstanding and unfulfilled needs in the art in simplifying raceway fabrication, allowing dramatic reduction in time and labor costs to complete a raceway installation while ensuring reliability of the mechanical and electrical interconnections. For example, using the systems and methods described herein result in 35% to 50% time savings in fabrication of raceways, compared to the known method of using threaded connections. Coupling without threads also avoids the issue of unprotected metal surfaces created by threading that corrodes and places grounding at risk.

Rigid metal conduits and rigid metal conduit raceways are used herein as examples only. The systems and methods described herein may be applied to other metal conduits or other electrical raceways, such as intermediate metal conduits and intermediate metal conduit raceways.

Figure 1A:
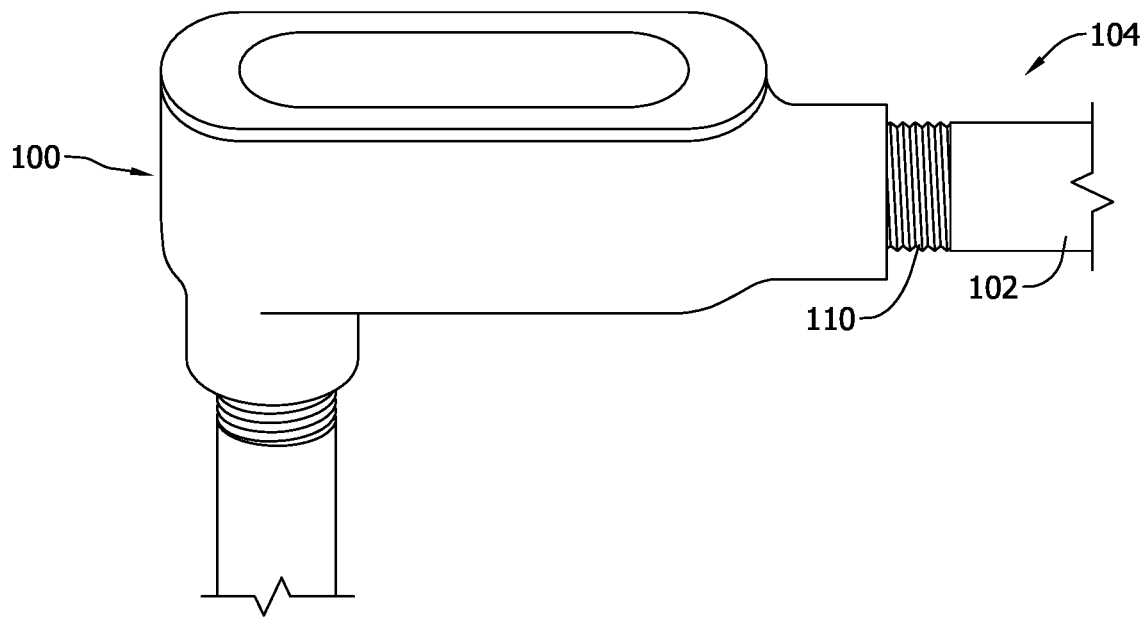
FIG. 1A is a perspective view of a rigid metal conduit (RMC) raceway fabricated with an exemplary known condulet.
Figure 1B:
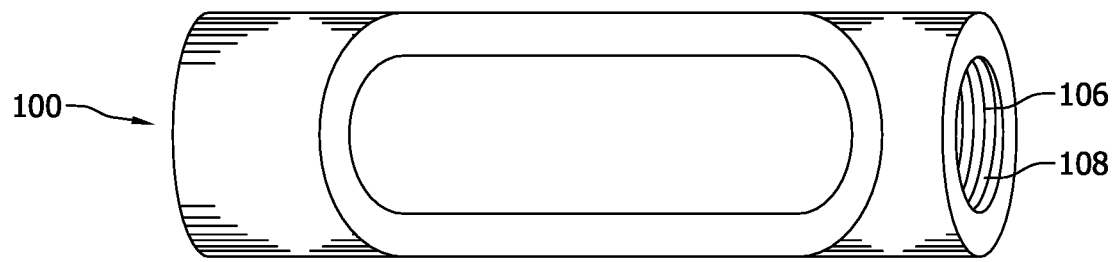
FIG. 1B is a top view of the condulet shown in FIG. 1A.

FIGS. 1A and 1B show a known condulet 100 for connecting rigid metal conduits 102 in assembling a rigid metal conduit raceway 104 of an electrical system. FIG. 1A shows the raceway 104 and FIG. 1B is a top view of the condulet 100 by itself. The condulet 100 includes threads 106 in its inner wall 108. Threads 110 must be formed on an exterior of the conduit 102 to couple the conduit 102 with the condulet 100. Moreover, the threads 110 on the conduit 102 and the threads 106 inside the condulet 100 must be able to mate with each other in order to couple the conduit 102 with the condulet 100.

Figure 2A:
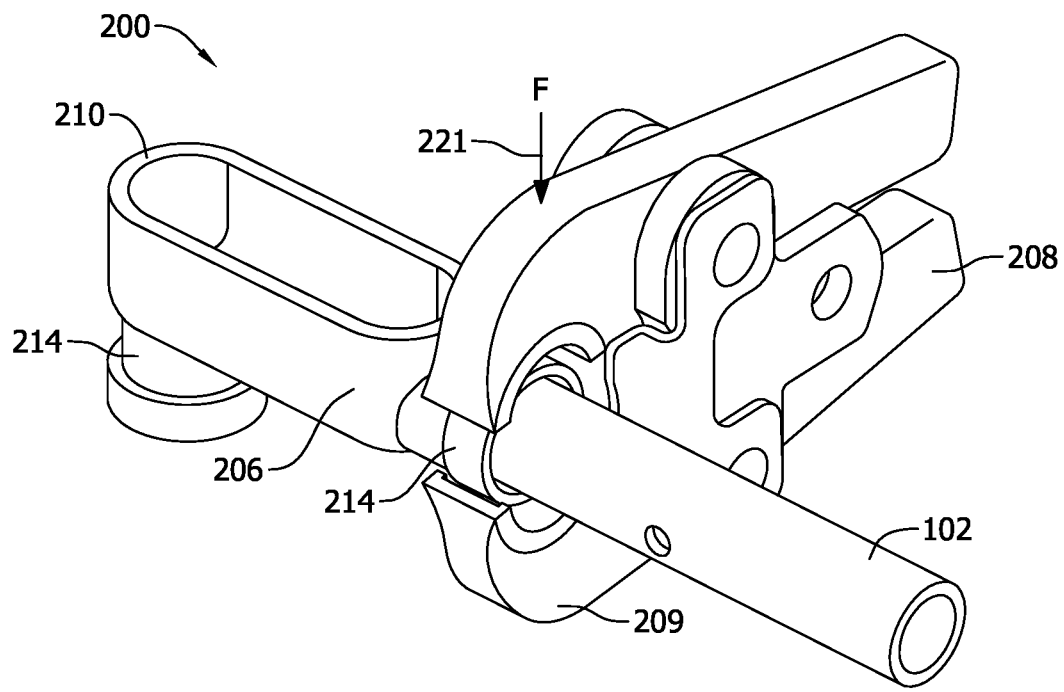
FIG. 2A shows an exemplary raceway fabrication system.
Figure 2B:
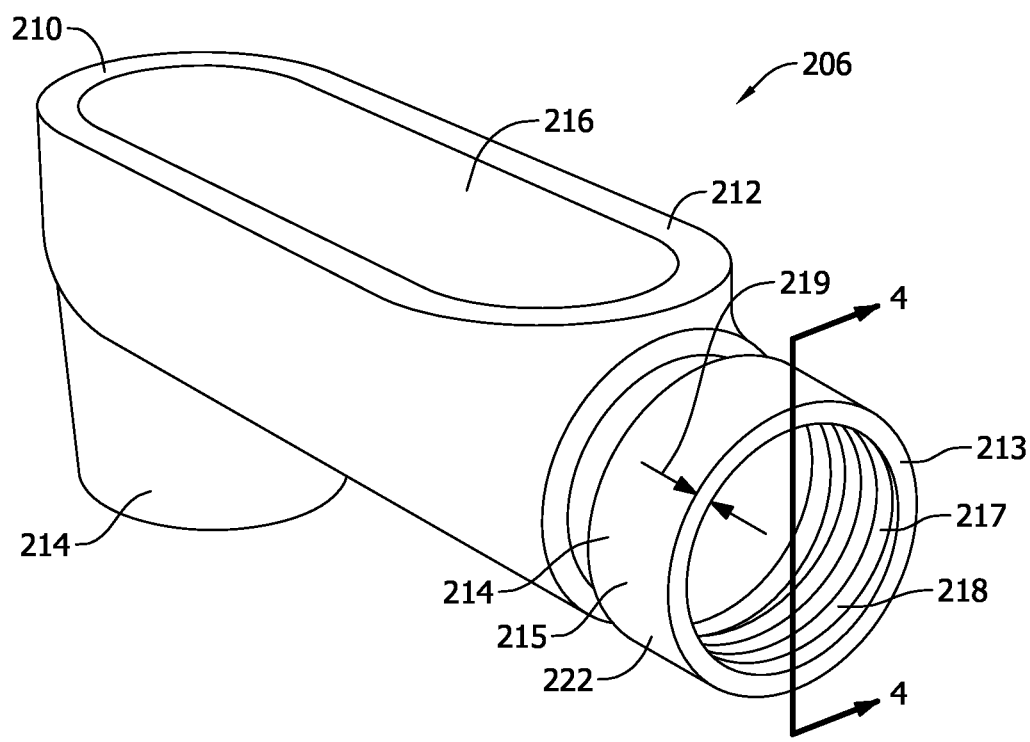
FIG. 2B is a perspective view of an exemplary condulet assembly of the system shown in FIG. 2A.
Figure 2C:
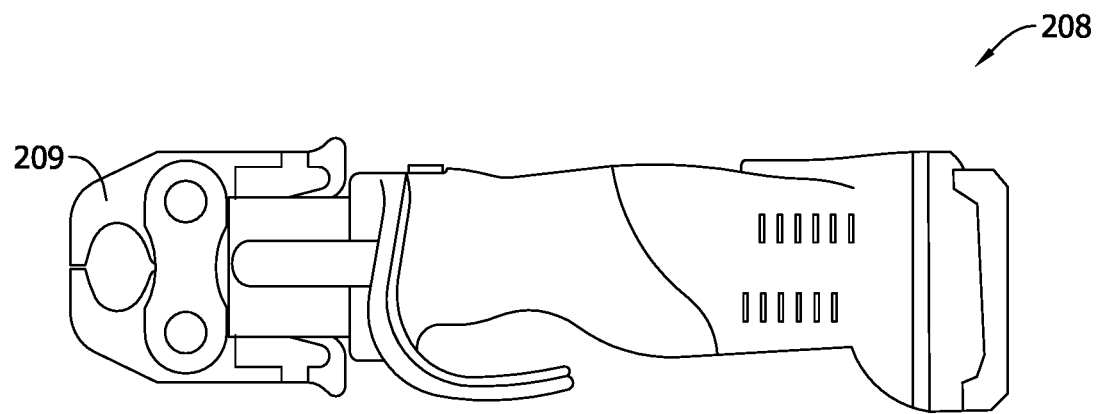
FIG. 2C is a side view of an exemplary press tool of the system shown in FIG. 2A.
Figure 2D:
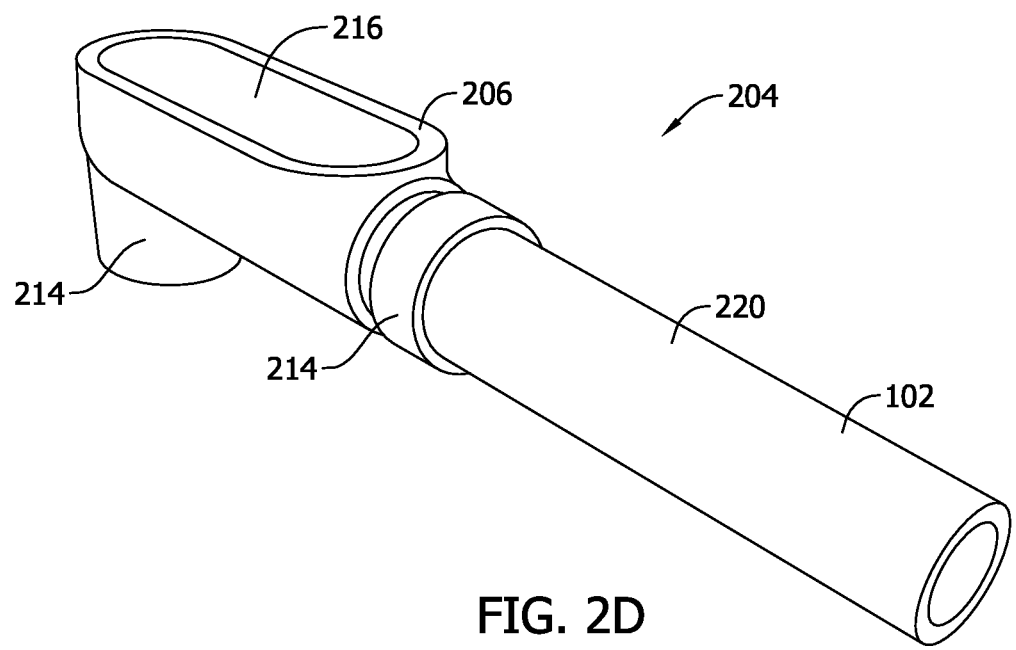
FIG. 2D is an exemplary RMC raceway fabricated with the system shown in FIG. 2A.

FIGS. 2A-2D show an exemplary raceway fabrication system 200 for connecting rigid metal conduits 102 in assembling a rigid metal conduit raceway 204. FIG. 2A shows the system 200. FIG. 2B is a perspective view of an exemplary condulet assembly 206 of the system 200. FIG. 2C shows an exemplary press tool 208 of the system 200. FIG. 2D shows a fabricated raceway 204 using the methods and systems described herein.

In the exemplary embodiment, the system 200 includes the condulet assembly 206 and the press tool 208. The press tool 208 is configured to clamp on the condulet assembly 206 having a conduit 102 received therein. In one embodiment, the press tool 208 includes a jaw 209. The jaw 209 may be expanded and compressed.

In the depicted example, the condulet assembly 206 includes a condulet 210. The condulet 210 includes a condulet body 212 and a mouth 214 extending from the condulet body 212. A rim 213 or an axial cross-section of the mouth 214 may be in a shape of a circle. The number of mouths 214 included in the condulet 210 may be one, two, or more than two. The plurality of mouths 214 of a condulet 210 may be the same or different to couple conduits 102 of different dimensions or shapes. The condulet 210 shown in FIGS. 2A, 2B, and 2D includes two mouths 214. The condulet 210 may include an access opening 216 that provides access to the wires insides the condulet 210. The condulet 210 may be fabricated from metal. The condulet 210 may be fabricated by casting. The condulet 210 is formed integrally as one single piece, where the mouth 214 and the condulet body 212 are formed as one piece, and coupled to each other without separate fasteners.

In the exemplary embodiment, the mouth 214 includes a mouth wall 215 and an interior ridge 218 positioned circumferentially along an interior 217 of the mouth wall 215. The interior ridge 218 extends from the interior 217 of the mouth wall 215. The interior ridge 218 is formed integrally with the mouth wall 215, where the condulet 210 is formed as one piece, and the interior ridge 218 is an integral part of the mouth 214 and coupled to the mouth wall 215 without separate fasteners. The interior ridge 218 may have been under local heat treatment such that the interior ridge 218 is hardened, facilitating engagement with the conduit 102. The condulet 210 may include a plurality of interior ridges 218. The multiple interior ridges 218 may be parallel to one another. The thickness 219 of the mouth wall 215 is substantially uniform along the circumference of the mouth 214. If a compression force F is applied on the exterior 222 of the mouth 214 through the press tool 208 along a direction 221 (FIG. 2A), ovaling may occur, where a cross-section of the mouth 214 through the interior ridge 218 may be changed to a shape that is not circular, such as an oval or ellipse with the short axis along the direction 221 and the long axis away from the direction 221. As such, part of an exterior 220 of the conduit 102 may not be in contact with the interior 217 of the mouth wall 215 at locations that are away from the compression point, and the engagement between the conduit 102 and the condulet 210 may not be as secure as desired.

In operation, an end of a conduit 102 is inserted into the mouth 214 of the condulet 210 (FIG. 2A). The jaw 209 is expanded to receive the mouth 214 of the condulet 210. A compression force F is applied such that the jaw 209 compresses on the mouth 214. In response to the compression force, the mouth 214 deforms and the interior ridge 218 presses into the exterior 220 of the conduit 102, forming indentations 706 (shown later in FIG. 7H) on the exterior 220 of the conduit 102. The conduit 102 is coupled with the condulet assembly 206 through the interior ridge 218 being engaged in the indentations 706 of the conduit 102. As a result, a raceway 204 is formed without the conduit having threads on the exterior 220, saving time, money, and labor.

Figure 3A:
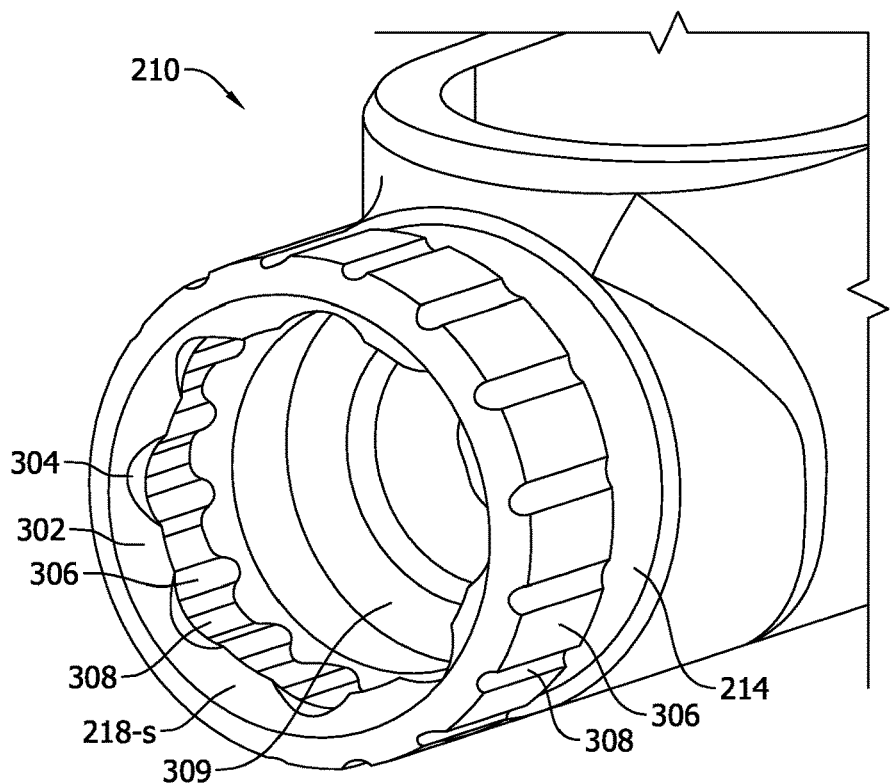
FIG. 3A is a partial view of an exemplary condulet for the system shown in FIG. 2A.
Figure 3B:
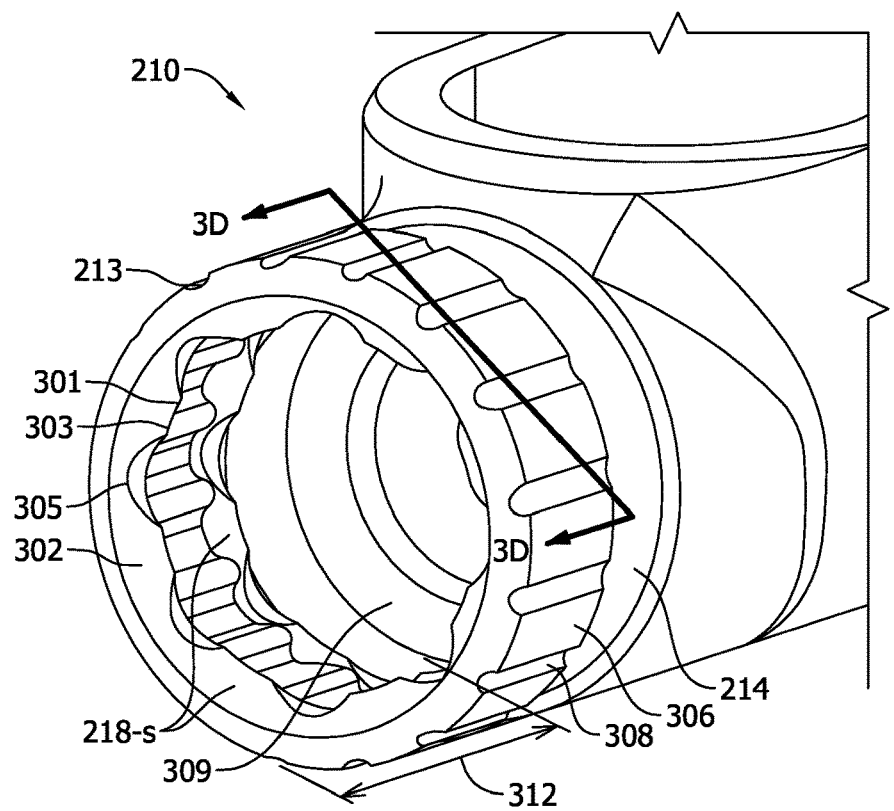
FIG. 3B is a partial view of another embodiment of a condulet for the system shown in FIG. 2A.
Figure 3C:
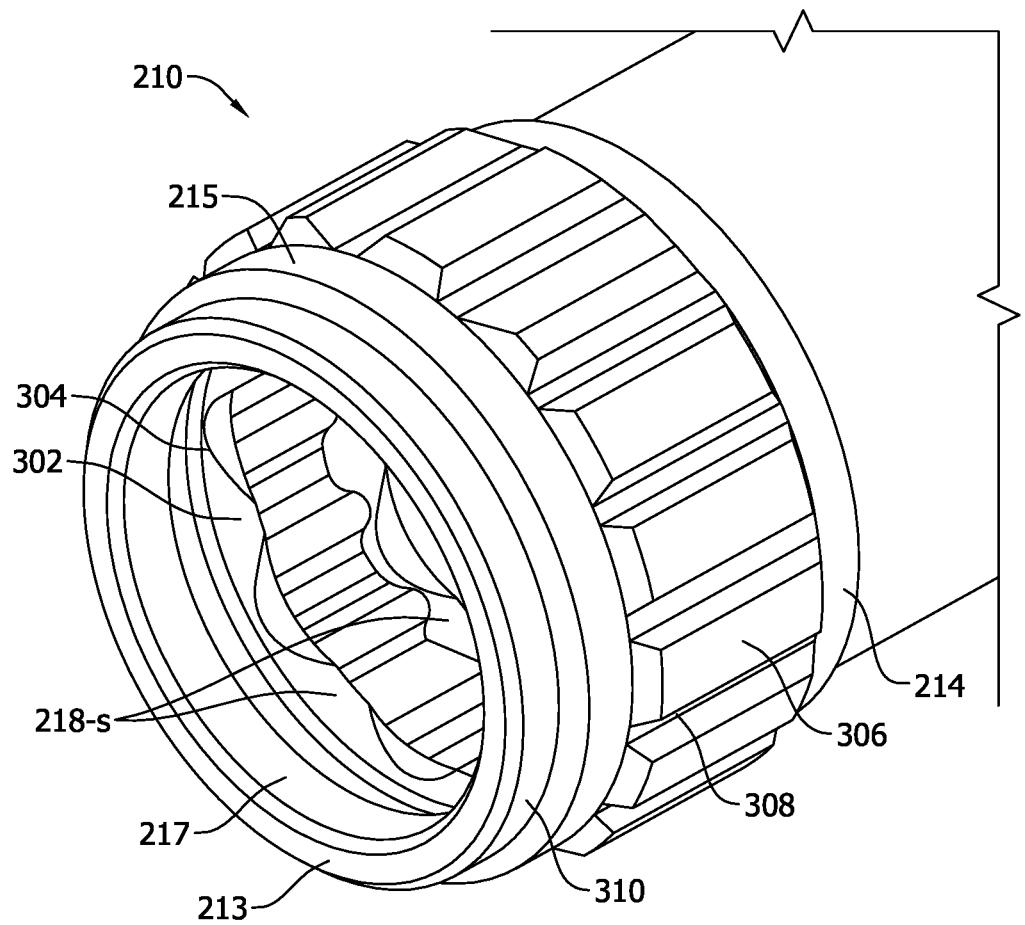
FIG. 3C is a partial view of one more embodiment of a condulet for the system shown in FIG. 2A.

FIGS. 3A-3C show partial perspective views of additional exemplary embodiments of the condulet 210. The interior ridge of the condulet 210 is a scalloped ridge 218-s. As used herein, a scalloped ridge is a ridge having a wavy outline 301. The wavy outline 301 has convex portions 303 and concave portions 305. The top of the convex portion 303 includes a relatively flat edge. Alternatively, the top of the convex portion 303 forms into an apex. The scalloped ridge 218-s incudes a plurality of projections 302 and a plurality of recesses 304. The projections 302 alternate with the recesses 304. The projections 302 may form convex portions 303. The recesses 304 may form concave portions 305. The scalloped ridge 218-s may be formed continuously and circumferentially along the interior 217 of the mouth wall 215. The condulet 210 may include a plurality of scalloped ridges 218-s (FIGS. 3B and 3C). The plurality of scalloped ridges may be parallel to each other. The projections 302 may be distributed evenly around the circumference of the mouth 214. Scalloped ridges 218-s provide multiple indentations 706 distributed all the way around the circumference of the conduit 102 (shown later in FIG. 7H). The mouth wall 215 is deformed at the multiple projections 302 and multiple recesses 304, reducing the force needed for compression. After compression, the conduit 102 engages with the condulet 210 through the scalloped ridges 218-s engaging the multiple indentations 706, providing secure coupling between the conduit 102 and the condulet 210. Because the mouth wall 215 may deform nonuniformly, ovaling may result.

In one embodiment, the mouth 214 of the condulet 210 further includes a plurality of longitudinal projections 306 and a plurality of longitudinal grooves 308. The longitudinal projections 306 and longitudinal grooves 308 may be provided in the interior 217 of the mouth wall 215. The scalloped ridges 218-s are positioned adjacent ends of the longitudinal projections 306 and the longitudinal grooves 308. One or both ends of the longitudinal projections 306 may form into projections 302 of the scalloped ridges 218-s, and one or both ends of the longitudinal grooves 308 may form into the recesses 304 of the scalloped ridges 218-s. The longitudinal projections 306 and the longitudinal grooves 308 may be positioned between two scalloped ridges 218-s, increasing the secureness of the fitting between the conduit 102 and the condulet assembly 206. The longitudinal projections 306 and longitudinal grooves 308 may also be provided on the exterior 222 of the mouth wall 215, identifying the locations of ridges 218-s for a compression force F to be applied.

In some embodiments, the mouth 214 may include a shoulder 309 (FIGS. 3A and 3B, also shown later in FIGS. 4A-4E, 7A, 7B, and 7F). The shoulder 309 limits the conduit 102 from being inserted too far into the condulet 210. The shoulder 309 may be rounded such that the shoulder 309 does not cause damages to wires (not shown) in the raceway 204 when the wires are pulled through the raceway 204.

The mouth 214 may further include an extended conduit guide 310 (FIG. 3C). The extended conduit guide 310 extends from the scalloped ridge 218-s, forming the rim 213 of the mouth 214. The extended conduit guide 310 increases a longitudinal engagement length 312 from the rim 213 to the shoulder 309. An increased longitudinal engagement length 312 improves the secureness of the fitting between the conduit 102 and the condulet 210.

Figure 3D:
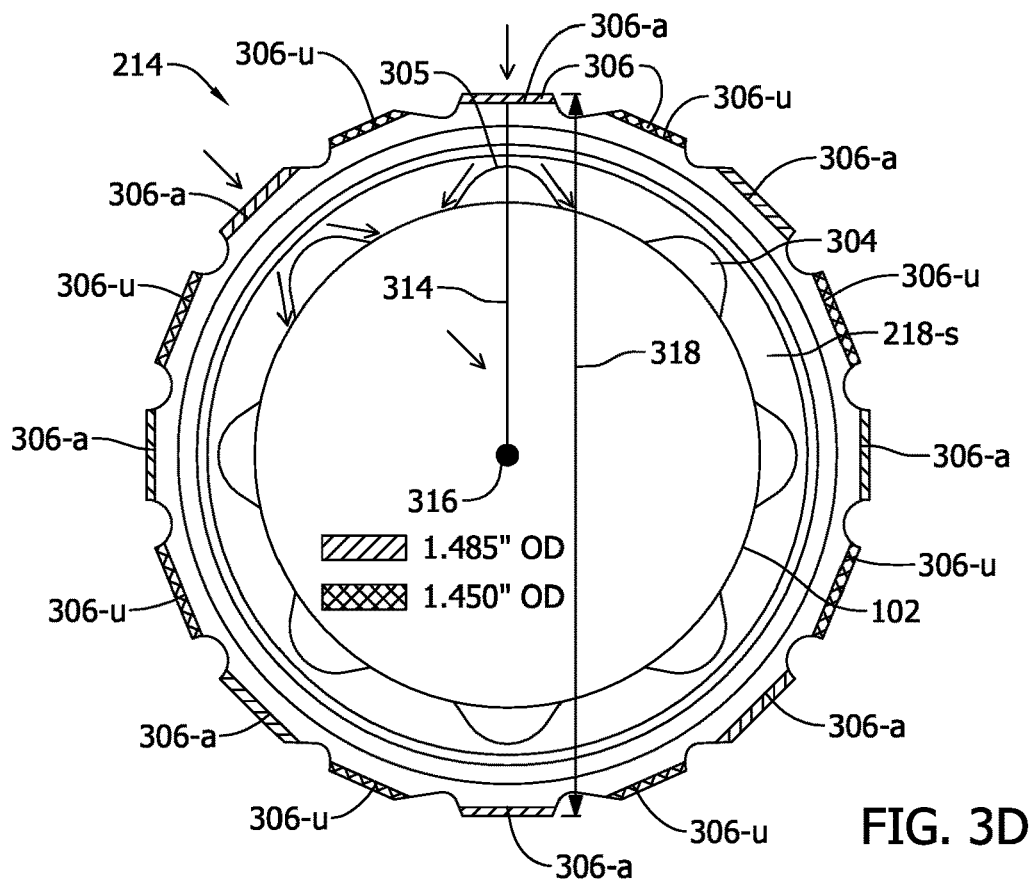
FIG. 3D is a cross-sectional view of an exemplary mouth along line 3D-3D shown in FIG. 3B.
Figure 3E:
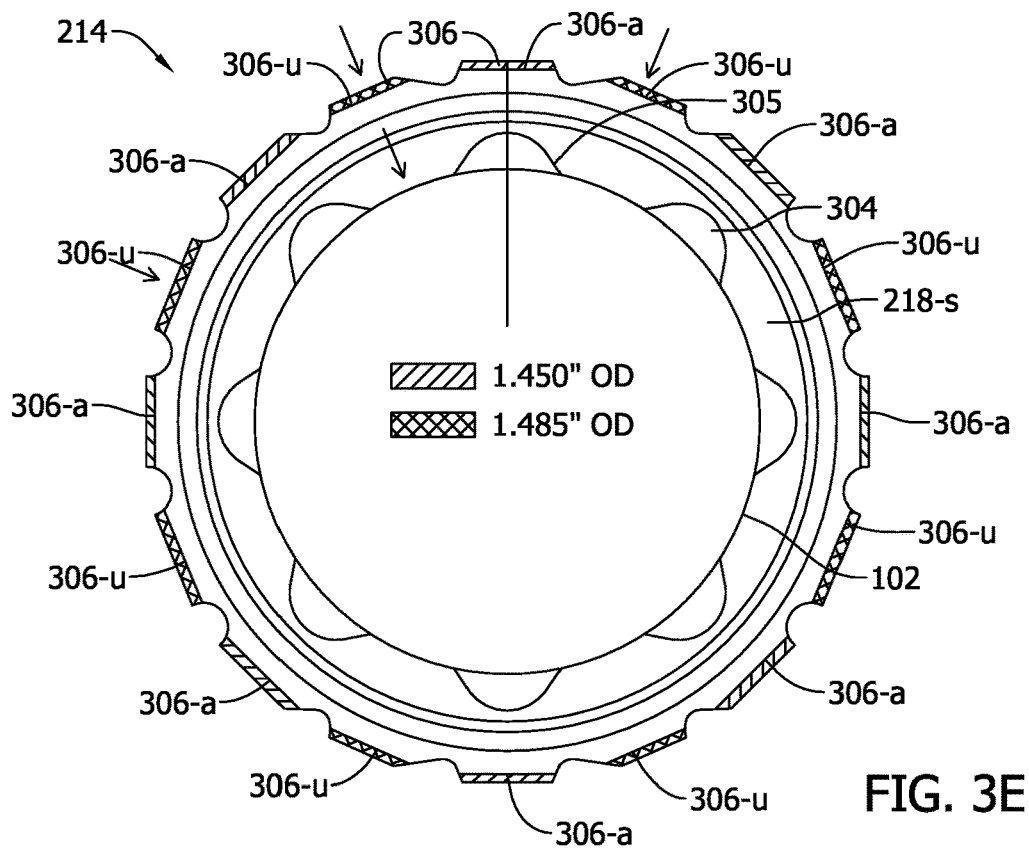
FIG. 3E is a cross-sectional view of another exemplary mouth along line 3D-3D shown in FIG. 3B.

FIGS. 3D and 3E are axial cross-sectional views of the exemplary various mouths 214 along line 3D-3D shown in FIG. 3B. The line 3D-3D is shown in FIG. 3B as an example only. The mouth 214 shown in FIGS. 3D and 3E may be included in the condulet 210 shown in FIGS. 3A and 3C. In the exemplary embodiments, the mouth 214 includes a scalloped ridge 218-s and longitudinal ridges or longitudinal projections 306. At least one of the longitudinal ridges 306 aligns with a concave portion 305 or the recess 304 of the scalloped ridge 218-s, where a radius line 314 from the center 316 of the mouth 214 intersects at least part of the aligned concave portion 305 and the aligned longitudinal ridge 306-a. The longitudinal ridge 306 has an outer diameter 318. The differences between the mouths 214 shown in FIGS. 3D and 3E are that the outer diameter 318 of the aligned longitudinal ridge 306-a relative to the outer diameter 318 of the longitudinal ridge 306 that is not aligned with a concave portion 305, which may be referred to as an unaligned longitudinal ridge 306-u.

In FIG. 3D, the outer diameter 318 of the aligned longitudinal ridge 306-a is greater than the outer diameter 318 of the unaligned longitudinal ridge 306-u. In operation, when a press tool 208 is placed on the longitudinal ridge 306, the press tool 208 contacts and applies force directly onto the aligned longitudinal ridge 306-a first due to its greater outer diameter 318. Because the aligned longitudinal ridge 306-a aligns with the concave portion 305, the arch of the concave portion 305 expands as a result of a direct application of force. The advantage of having an aligned longitudinal ridge 306-a having a greater outer diameter 318 that that of the unaligned longitudinal ridge 306-u is that the displacement towards the conduit 102 is amplified, and is advantageously suitable for a smaller conduit 102, when the interior ridges 218 needs to be displaced at a greater distance to contact the conduit 102 and form indentations.

In contrast, in FIG. 3E, the outer diameter 318 of the aligned longitudinal ridge 306-a is smaller than the outer diameter 318 of the unaligned longitudinal ridge 306-u. In operation, when a press tool 208 is placed on the longitudinal ridges 306, the press tool 208 contacts and applies force directly onto the unaligned longitudinal ridge 306-u first, and therefore applies force directly toward the outer surface of the conduit. In this embodiment, force toward the conduit 102 is amplified, and therefore a greater pressure may be applied to the conduit 102.

Figure 4A:
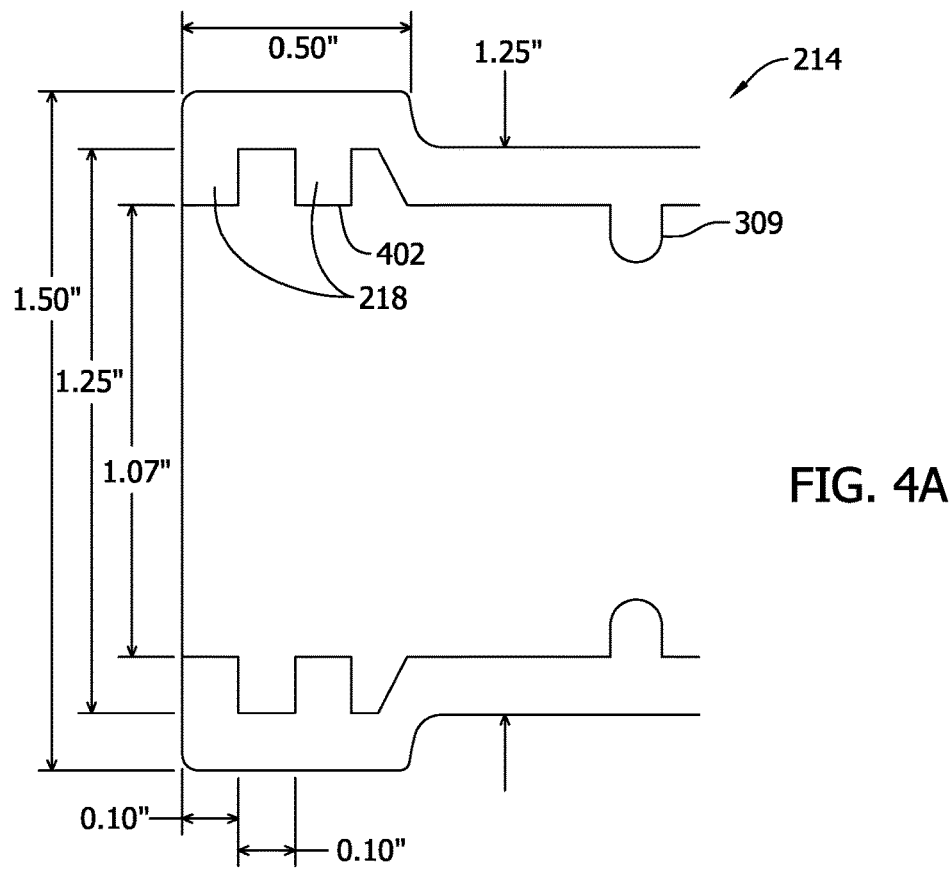
FIG. 4A is a partial cross-sectional view of an exemplary condulet for the system shown in FIG. 2A.
Figure 4B:
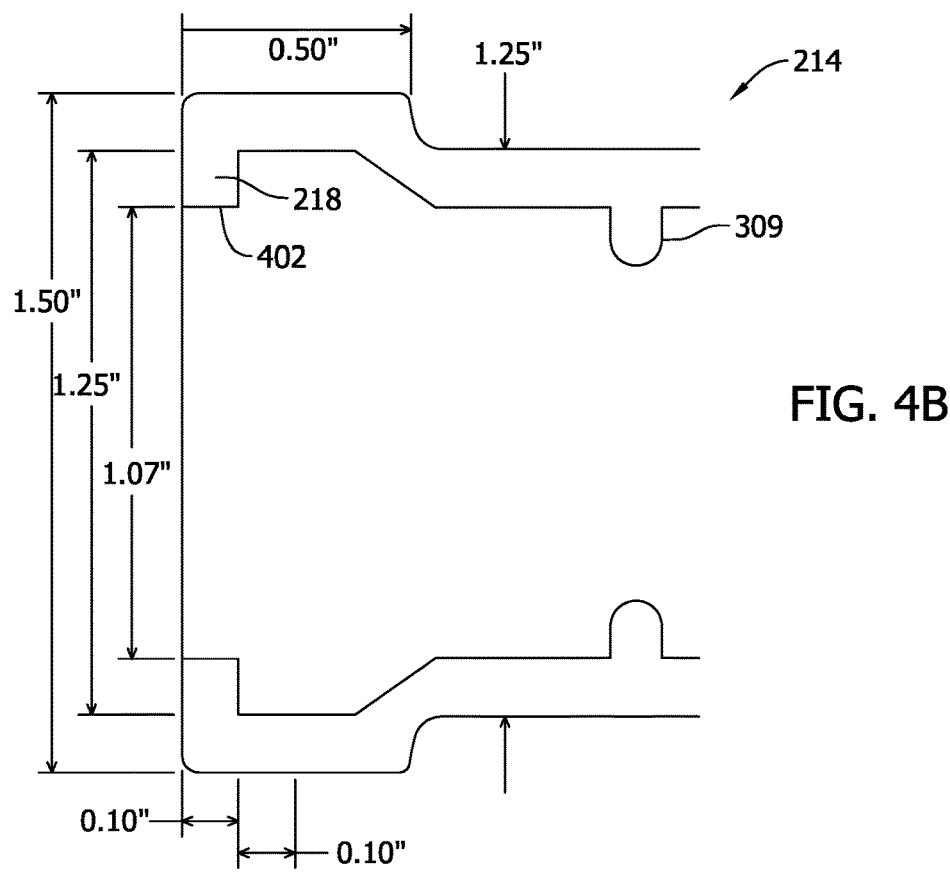
FIG. 4B is a partial cross-sectional view of another exemplary condulet for the system shown in FIG. 2A.
Figure 4C:
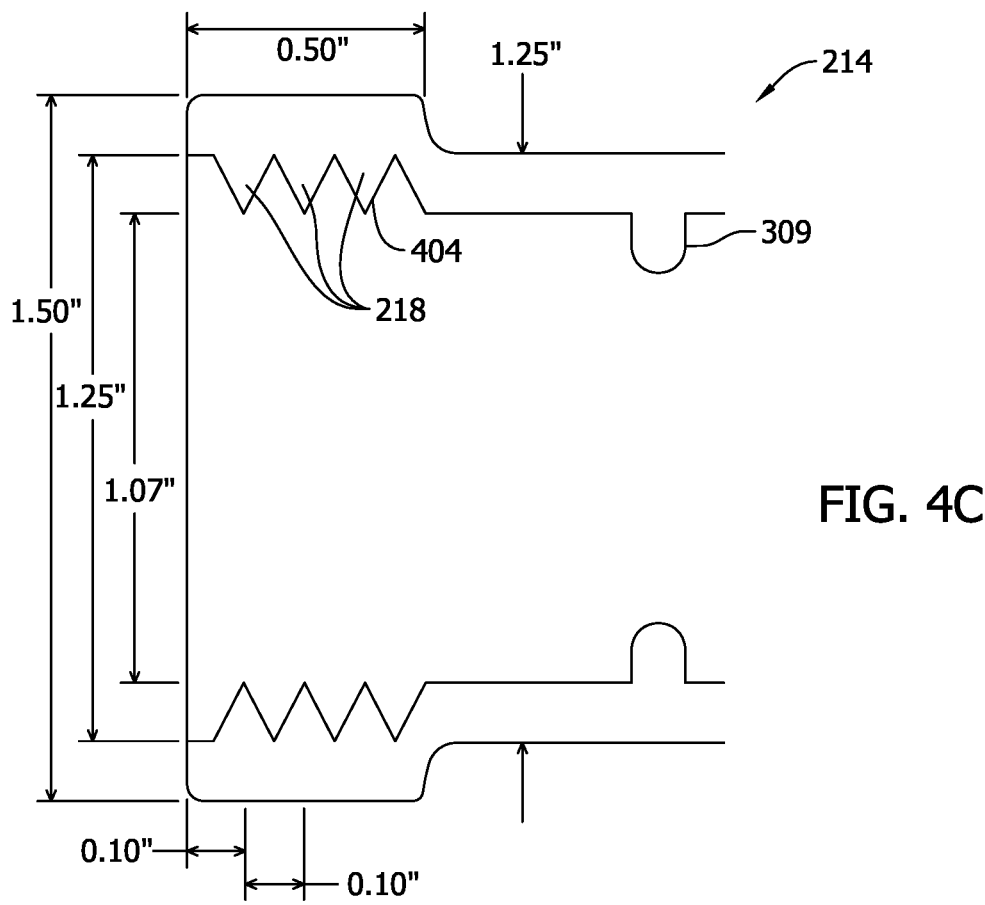
FIG. 4C is a partial cross-sectional view of one more exemplary condulet for the system shown in FIG. 2A.
Figure 4D:
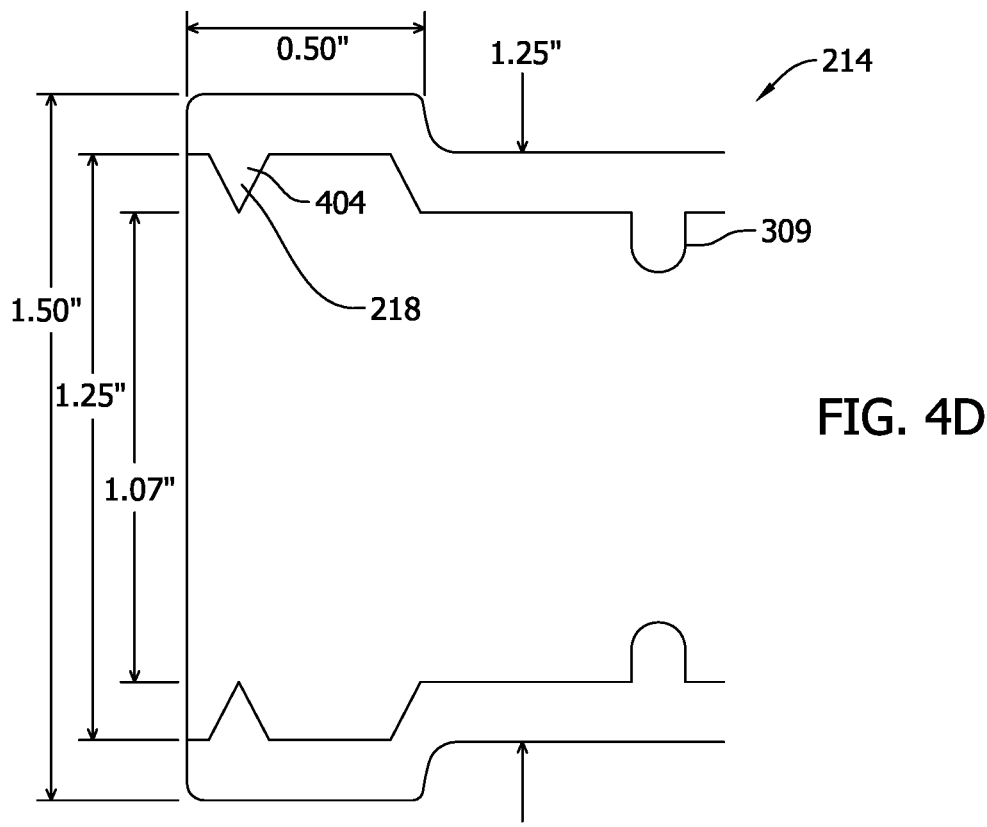
FIG. 4D is a partial cross-sectional view of one more exemplary condulet for the system shown in FIG. 2A.
Figure 4E:
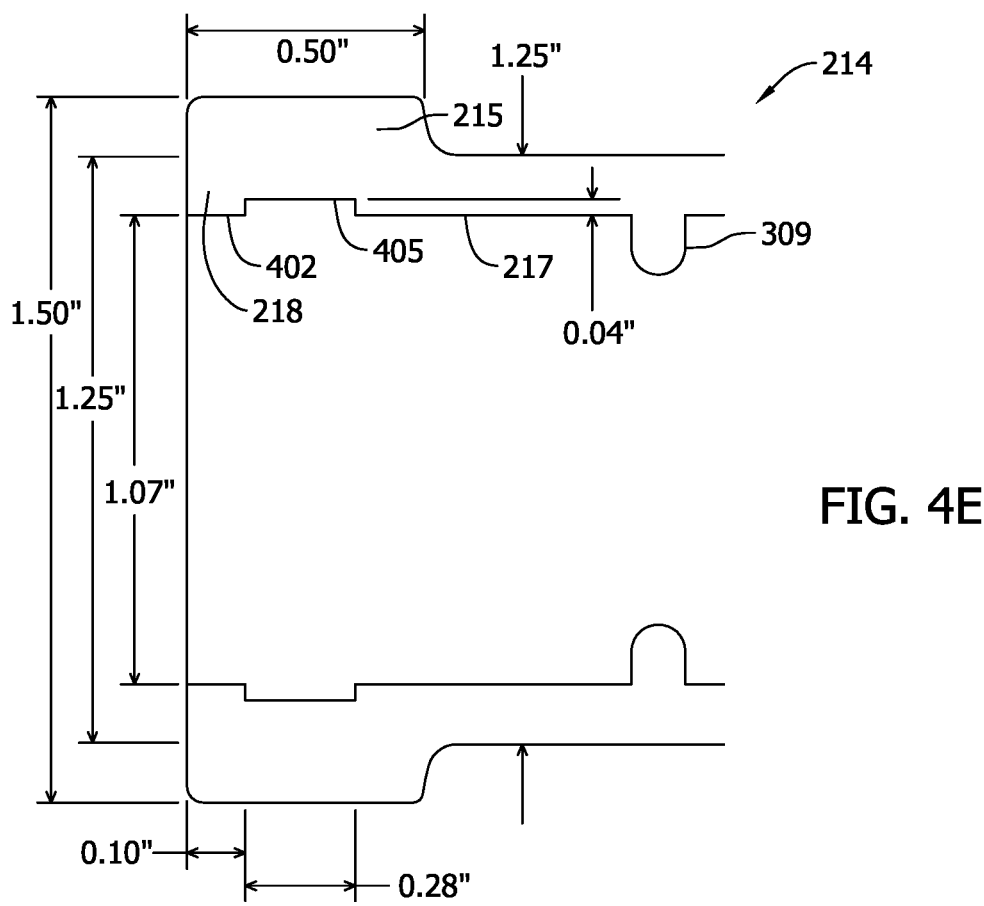
FIG. 4E is a partial cross-sectional view of one more exemplary condulet for the system shown in FIG. 2A.

FIGS. 4A-4E show partial longitudinal cross-sectional views of exemplary various embodiments of the mouth 214 along line 4-4 shown in FIG. 2B. The mouths 214 in FIGS. 4A-4E have various numbers and shapes of interior ridges 218. The interior ridges 218 may be scalloped ridges 218-s. In FIGS. 4A, 4B, and 4E, the interior ridge 218 has a flat end 402. The mouth 214 shown in FIG. 4A includes two interior ridges 218, while the mouth shown in FIG. 4B includes one interior ridge 218. In FIGS. 4C and 4D, the interior ridge 218 has a triangular end 404 that form into a tooth for biting into the conduit 102. The mouth 214 shown in FIG. 4C includes a plurality of interior ridges 218, while the mouth 214 shown in FIG. 4D includes one single interior ridge 218. A plurality of tooth-like interior ridges 218 spread out load from the compression force, and do not bite into the conduit 102 as effective as a single tooth-like interior ridge 218.

In one embodiment, a circumferential groove 405 is formed in the interior 217 of the mouth wall 215 (FIG. 4E). The circumferential groove 405 is sized to receive a gripping ring (not shown). The gripping ring is used to further facilitate the coupling between the conduit 102 and the condulet 210, and may be used to provide grounding for the raceway 104 when the gripping ring is composed of electrically-conductive material.

Figure 5A:
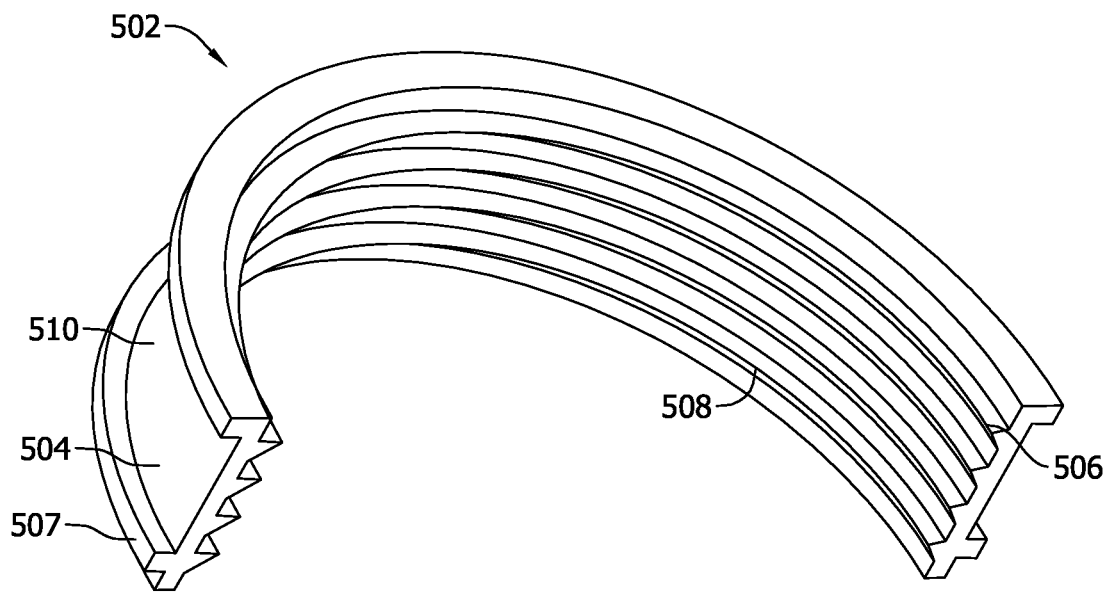
FIG. 5A is a perspective view of an exemplary gasket for the system shown in FIG. 2A.
Figure 5B:
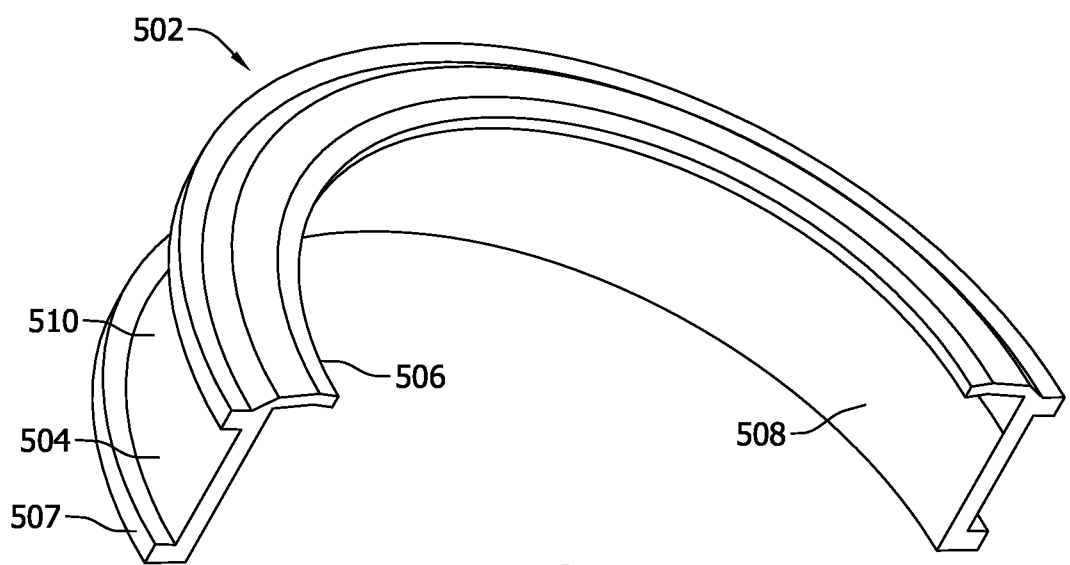
FIG. 5B is a perspective view of another exemplary gasket for the system shown in FIG. 2A.

The condulet assembly 206 may further include a gasket 502 (FIGS. 5A and 5B, also see FIGS. 7A-7D, 7F, and 7G). FIGS. 5A and 5B show exemplary embodiments of gaskets 502. The gasket 502 may be formed as one ring, or a ring segment. When the gasket 502 is formed as a ring segment, a plurality of gaskets 502 may be used in the condulet assembly 206. The gasket 502 is composed of silicone, neoprene, or other elastic materials that enable the gasket 502 to function as disclosed herein.

In the exemplary embodiment, the gasket 502 includes a ring body 504, and one or more first lips 506 extending from the ring body 504. The ring body includes a first side 508 and a second side 510 opposite the first side 508. The ring body forms a ring or part of a ring, with the first side 508 facing a center of the ring. The first lip 506 extends from the ring body 504 from the first side 508. The gasket 502 also includes one or more second lips 507 positioned on the second side 510. The first lips 506 and the second lips 507 are positioned circumferentially around the ring body. The first lips 506 may be parallel with each other. The second lips 507 may also be parallel with each other.

In operation, the gasket 502 is placed along the interior of the condulet 210 and circumscribes the exterior of the conduit 102. The gasket 502 provides sealing for the raceway 204, preventing water, dust, or other materials from entering into the raceway 204 and causing damages to the wires inside the raceway 204.

Figure 6:
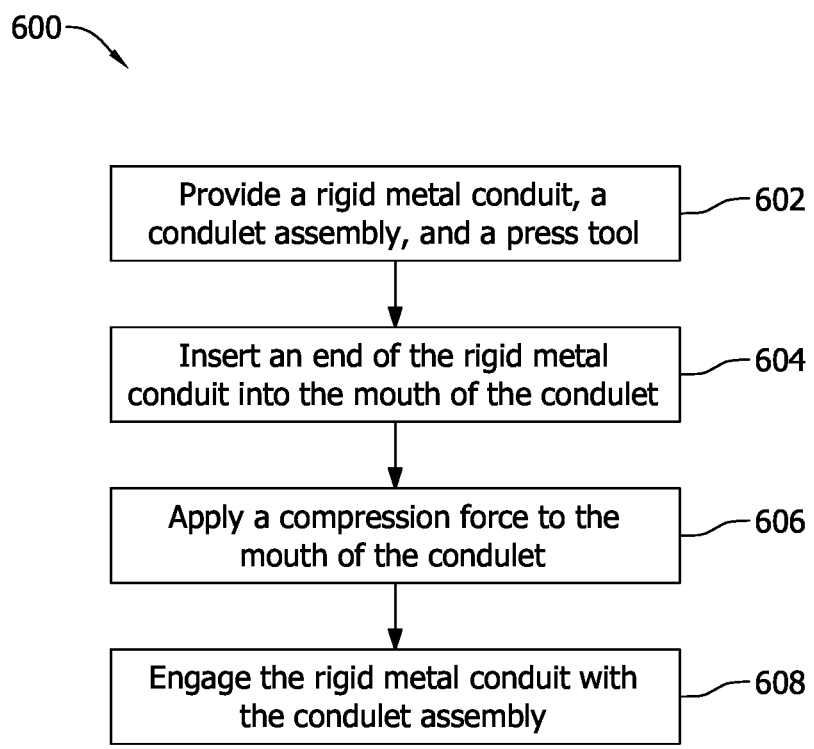
FIG. 6 is a flow chart of an exemplary method of fabricating an RMC raceway using the system and condulet assemblies shown in FIGS. 2A-5B.
Figure 7A:
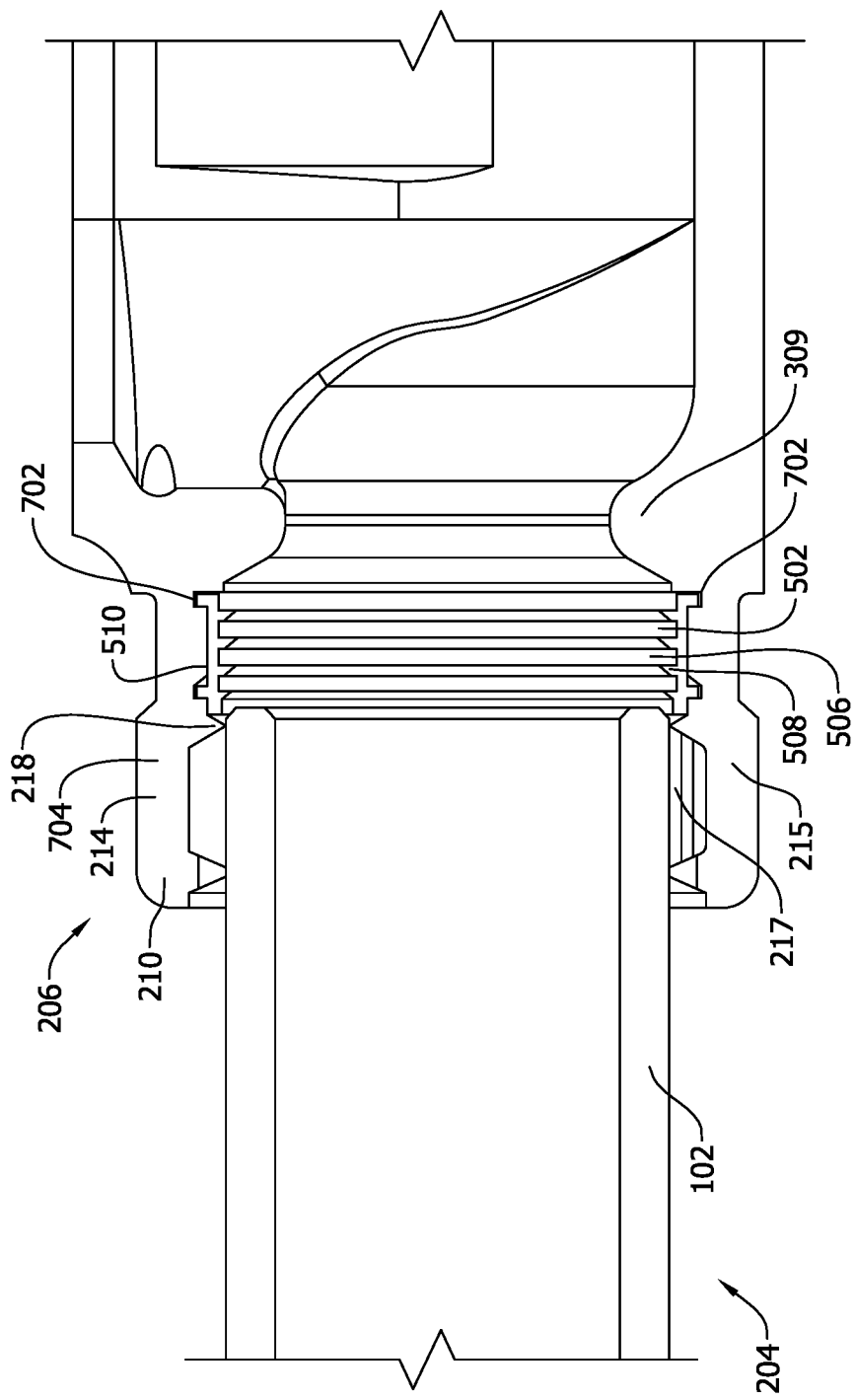
Figure 7E:
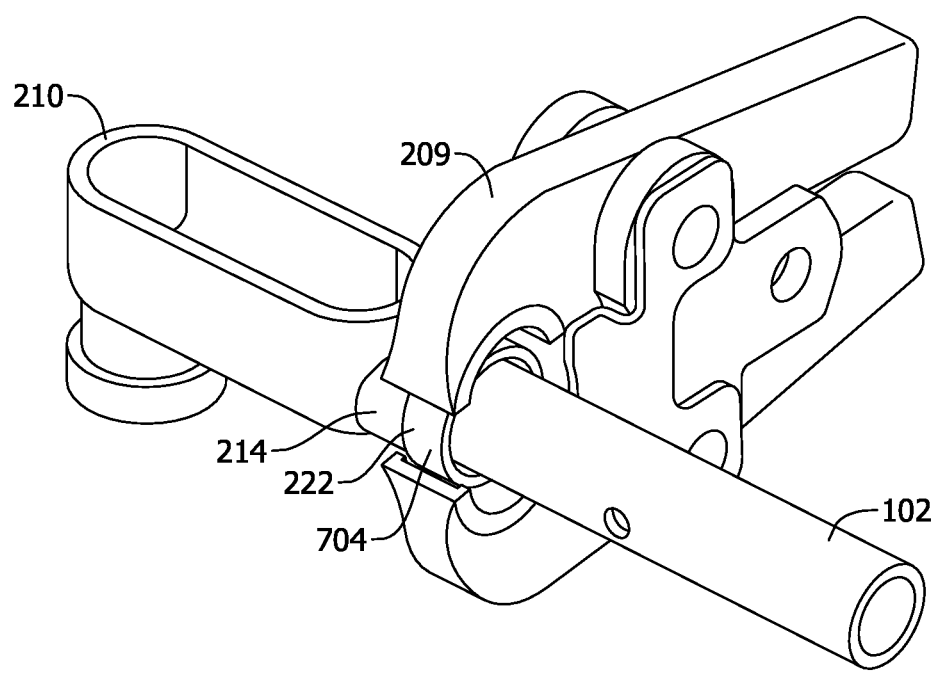

FIGS. 6-7H show an exemplary method 600 of fabricating a rigid metal conduit raceway of an electrical system. FIG. 6 is a flow chart of the method 600. FIGS. 7A-7H are schematic diagrams of the method 600. The method 600 includes providing 602 a rigid metal conduit, a condulet assembly, and a press tool. The condulet assembly and the press tool may be any of the condulet assemblies and press tools described above. The condulet assembly 206 may be assembled by inserting the gasket 502 into the mouth 214 of the condulet 210 (FIG. 7A). In one embodiment, the mouth 214 includes one or more circumferential grooves 702 in the interior 217 of the mouth wall 215. The gasket 502 includes first lips 506 on the first side 508 and also second lips 507 on the second side 510. The gasket 502 may be placed along the interior 217 of the mouth wall 215 such that the second lips 507 on the second side 510 are lodged in the circumferential grooves 702 of the mouth wall 215. Alternatively, the gasket 502 may be placed around the conduit 102 and then inserted into the mouth 214.

In the exemplary embodiment, the method 600 also includes inserting 604 an end of the rigid metal conduit into the condulet assembly. The condulet 210 may include the shoulder 309. The shoulder 309 prevents the conduit 102 from being inserted too far into the condulet 210. Once the conduit 102 is fully inserted into the mouth 214, where the conduit 102 abuts the shoulder 309 (FIGS. 7B-7D), the first lips 506 on the first side 508 of the gasket 502 deform and press against the exterior 220 of the conduit 102, providing seal to the raceway 204. The mouth 214 may include a projection 704 at the exterior 222 of the mouth 214. The location of the projection 704 may correspond to the location of the interior ridge 218 positioned on the interior 217 of the mouth wall 215, indicating the location to apply a compression force.

In the exemplary embodiment, the method 600 further includes applying 606 a compression force to the mouth of the condulet at the interior ridges inside the mouth to compress the condulet assembly against the rigid metal conduit and form indentations on the exterior of the rigid metal conduit (FIGS. 7E-7H). Before applying a compression force, the jaw 209 is expanded for the jaw 209 to hold the mouth 214 of the condulet 210 with the conduit 102 received therein. The jaw 209 may be placed over the projection 704 on the exterior 222 of the mouth 214 such that the compression force is applied directly onto the interior ridge 218 for the interior ridge 218 to bite into the conduit 102 (FIGS. 7F and 7G), forming indentations 706 (FIGS. 7F-7H) in the conduit 102. Similarly, although not shown in FIG. 7F, the interior ridge 218-$p$ positioned proximate the rim 213 of the mouth wall 215 may also form indentations 706-$p$ in the conduit 102, when the compression force is applied (see FIG. 7H). The rigid metal conduit is engaged 608 with the condulet assembly at the indentations. In addition, because the gasket 502 is composed of elastic material and has deformable lips 506 and/or 507, the gasket 502 may expand or be compressed in different degrees around the circumference to accommodate the gap between the mouth wall 215 and the conduit 102, thereby ensuring seal for the raceway, even when ovaling results.

The benefits and advantages of the inventive concepts are now believed to have been amply illustrated in relation to the exemplary embodiments disclosed. For example, the embodiments described herein facilitate raceway fabrication without creating threads on conduits or without using conduit having threads, thereby reducing or eliminating cost, safety risks, and labor associated with threaded connections between conduits and condulets. Avoiding a need to create threads also reduces or eliminates imperfections such as burrs in the conduits, thereby reducing or eliminating damage to electrical wires when being pulled through and/or weakened threaded connection. Moreover, the fabrication process is simplified with much-reduced number of components needed for assembling. The condulet is formed as one single piece, and the interior ridges are integrated with the mouth wall of the condulet. To interconnect conduits, the conduits only need to be inserted into a condulet and a compression force is applied afterwards, unlike a known system where separate teeth and auxiliary elements need to be placed inside a condulet or on the conduit before a compression force can be applied. Further, a scalloped ridge provides multiple indentations all around the conduit, thereby increasing the secureness of the coupling between the condulet and the conduit. In addition, a seal formed by the condulet assemblies described herein keeps water or dust from entering inside conduits and interfering with electricity carried by electrical wires, thereby eliminating additional material or processes to seal the connections in known systems and methods.

An embodiment of a condulet assembly for fabricating a rigid or intermediate metal conduit raceway of an electrical system is provided. The condulet assembly includes a condulet sized to receive a rigid or intermediate metal conduit of the metal conduit raceway, the condulet formed integrally as one piece, the condulet including a condulet body and a mouth. The mouth includes a mouth wall extending from the condulet body, and an interior ridge positioned circumferentially along an interior of the mouth wall and extending from the interior of the mouth wall. The interior ridge is formed integrally with the mouth wall, and includes a plurality of projections and a plurality of recesses. The interior ridge has a wavy outline with the plurality of projections forming a plurality of convex portions of the outline and the plurality of recesses forming a plurality of concave portions of the outline. The plurality of projections are configured to form a plurality of indentations circumferentially around an exterior of the metal conduit and engage the metal conduit at the plurality of indentations when the mouth is compressed with the metal conduit received therein. The condulet assembly further includes a gasket sized to circumscribe the metal conduit and including a ring body and a condulet. The ring body forms at least part of a circle and has a first side and a second side opposite the first side, the first side facing a center of the circle. The first lip is positioned on the first side and extends circumferentially along the ring body, wherein the gasket deforms and seals a gap between the interior of the mouth wall and the exterior of the metal conduit when the mouth is compressed with the metal conduit received therein.

Optionally, the interior ridge is formed continuously along a circumference of the interior of the mouth wall. The gasket includes a plurality of first lips formed on the first side. The gasket further includes one or more second lips formed on the second side of the ring body and extending from the ring body, and the mouth of the condulet further including one or more corresponding grooves formed circumferentially along the interior of the mouth wall and sized to receive the one or more second lips therein. The mouth includes a plurality of interior ridges positioned circumferentially along the interior of the mouth of the condulet. The mouth further includes a plurality of longitudinal grooves and a plurality of longitudinal projections extending between two of the plurality of interior ridges. The mouth further includes an extended conduit guide extending from the interior ridge and forming a rim of the mouth. The mouth further includes a groove formed circumferentially along an interior of the mouth and positioned adjacent the interior ridge, the groove sized to receive a gripping ring.

Another embodiment of a condulet assembly for fabricating a rigid or intermediate metal conduit raceway of an electrical system is provided. The condulet assembly includes a condulet sized to receive a rigid or intermediate metal conduit of the metal conduit raceway, the condulet formed integrally as one piece. The condulet includes a condulet body and a mouth including a mouth wall extending from the condulet body and an interior ridge. The interior ridge is positioned circumferentially along an interior of the mouth wall and extends from the interior of the mouth wall, the interior ridge formed integrally with the mouth wall. The interior ridge includes a plurality of projections and a plurality of recesses and having a wavy outline with the plurality of projections forming a plurality of convex portions of the outline and the plurality of recesses forming a plurality of concave portions of the outline. The plurality of projections are configured to form a plurality of indentations circumferentially around an exterior of the metal conduit and engage the metal conduit at the plurality of indentations when the mouth is compressed with the metal conduit received therein.

Optionally, the interior ridge is formed continuously along a circumference of the interior of the mouth wall. The mouth includes a plurality of interior ridges positioned circumferentially along the interior of the mouth of the condulet. The mouth further includes a plurality of longitudinal grooves and a plurality of longitudinal projections extending between two of the plurality of interior ridges. The mouth further includes an extended conduit guide extending from the interior ridge and forming a rim of the mouth.

One more embodiment of a condulet assembly for fabricating a rigid or intermediate metal conduit raceway of an electrical system is provided. The condulet assembly includes a condulet sized to receive a rigid or intermediate metal conduit of the metal conduit raceway, the condulet formed integrally as one piece, the condulet further including a condulet body and a mouth. The mouth includes a mouth wall extending from the condulet body and an interior ridge positioned circumferentially along an interior of the mouth wall and projecting from the interior of the mouth wall. The interior ridge is formed integrally with the mouth wall and configured to form indentations on an exterior of the metal conduit and engage the metal conduit at the indentations when the mouth is compressed with the metal conduit received therein. The condulet assembly further includes a gasket sized to circumscribe the metal conduit and including a ring body and a first lip. The ring body forms at least part of a circle and has a first side and a second side opposite the first side, the first side facing a center of the circle. The first lip is positioned on the first side and extends circumferentially along the ring body, wherein gasket deforms and seals a gap between the interior of the mouth wall and the exterior of the metal conduit when the mouth is compressed with the metal conduit received therein.

Optionally, the gasket is integrally formed as one piece. The gasket includes a plurality of first lips formed on the first side. The gasket further includes one or more second lips formed on the second side and extending from the ring body, and the mouth of the condulet further including one or more corresponding grooves formed circumferentially along the interior of the mouth wall and sized to receive the one or more second lips therein. The mouth of the condulet includes a plurality of interior ridges. The mouth of the condulet further includes a plurality of longitudinal grooves and a plurality of longitudinal projections extending between two of the plurality of interior ridges. The mouth of the condulet further includes an extended conduit guide extending from the interior ridge and forming a rim of the mouth. The interior ridge includes a plurality of projections and a plurality of recesses and has a wavy outline with the plurality of projections forming a plurality of convex portions of the outline and the plurality of recesses forming a plurality of concave portions of the outline, the mouth of the condulet further includes a plurality of longitudinal grooves and a plurality of longitudinal projections, wherein at least one of the plurality of longitudinal projections aligns with one of the concave portions of the interior ridge. Longitudinal projections that align with a concave portion of the interior ridge have an outer diameter greater than longitudinal projections that do not align with the concave portion of the interior ridge. Longitudinal projections that align with a concave portion of the interior ridge have an outer diameter smaller than longitudinal projections that do not align with the concave portion of the interior ridge While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments certain of the components in the assemblies described may be omitted to accommodate particular types of conduit or the needs of particular installations, while still providing cost effective cold press fit coupling connections of conduit for electrical wiring or cabling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A condulet assembly for fabricating a rigid or intermediate metal conduit raceway of an electrical system, comprising:
   a condulet sized to receive a rigid or intermediate metal conduit of the metal conduit raceway the condulet formed integrally as one piece, the condulet comprising:
   a condulet body; and a mouth comprising: a mouth wall extending from the condulet body; and
   an interior ridge positioned circumferentially along an interior of the mouth wall and extending from the interior of the mouth wall, the interior ridge formed integrally with the mouth wall, the interior ridge including a plurality of projections and a plurality of recesses and having a wavy outline with the plurality of projections forming a plurality of convex portions of the outline and the plurality of recesses forming a plurality of concave portions of the outline, the plurality of projections configured to form a plurality of indentations circumferentially around an exterior of the metal conduit and engage the metal conduit at the plurality of indentations when the mouth is compressed with the metal conduit received therein; and a gasket sized to circumscribe the metal conduit and comprising: a ring body forming at least part of a circle and having a first side and a second side opposite the first side, the first side facing a center of the circle; and a first lip positioned on the first side and extending circumferentially along the ring body, wherein the gasket deforms and seals a gap between the interior of the mouth wall and the exterior of the metal conduit when the mouth is compressed with the metal conduit received therein.

2. The condulet assembly of claim 1, wherein the interior ridge is formed continuously along a circumference of the interior of the mouth wall.

3. The condulet assembly of claim 1, wherein the gasket includes a plurality of first lips formed on the first side.

4. The condulet assembly of claim 1, wherein the gasket further includes one or more second lips formed on the second side of the ring body and extending from the ring body, and the mouth of the condulet further comprising one or more corresponding grooves formed circumferentially along the interior of the mouth wall and sized to receive the one or more second lips therein.

5. The condulet assembly of claim 1, wherein the mouth includes a plurality of interior ridges positioned circumferentially along the interior of the mouth of the condulet.

6. The condulet assembly of claim 5, wherein the mouth further comprises a plurality of longitudinal grooves and a plurality of longitudinal projections extending between two of the plurality of interior ridges.

7. The condulet assembly of claim 1, wherein the mouth further comprises an extended conduit guide extending from the interior ridge and forming a rim of the mouth.

8. The condulet assembly of claim 1, wherein the mouth further includes a groove formed circumferentially along an interior of the mouth and positioned adjacent the interior ridge, the groove sized to receive a gripping ring.

9. A condulet assembly for fabricating a rigid or intermediate metal conduit raceway of an electrical system, comprising:
  a condulet sized to receive a rigid or intermediate metal conduit of the metal conduit raceway, the condulet formed integrally as one piece,
  the condulet comprising:
    a condulet body; and
    a mouth comprising:
      a mouth wall extending from the condulet body; and
      an interior ridge positioned circumferentially along an interior of the mouth wall and extending from the interior of the mouth wall, the interior ridge formed integrally with the mouth wall, the interior ridge including a plurality of projections and a plurality of recesses and having a wavy outline with the plurality of projections forming a plurality of convex portions of the outline and the plurality of recesses forming a plurality of concave portions of the outline, the plurality of projections configured to form a plurality of indentations circumferentially around an exterior of the metal conduit and engage the metal conduit at the plurality of indentations when the mouth is compressed with the metal conduit received therein.

10. The condulet assembly of claim 9, wherein the interior ridge is formed continuously along a circumference of the interior of the mouth wall.

11. The condulet assembly of claim 9, wherein the mouth includes a plurality of interior ridges positioned circumferentially along the interior of the mouth of the condulet.

12. The condulet assembly of claim 11, wherein the mouth further comprises a plurality of longitudinal grooves and a plurality of longitudinal projections extending between two of the plurality of interior ridges.

13. The condulet assembly of claim 9, wherein the mouth further comprises an extended conduit guide extending from the interior ridge and forming a rim of the mouth.

14. A condulet assembly for fabricating a rigid or intermediate metal conduit raceway of an electrical system, comprising:
  a condulet sized to receive a rigid or intermediate metal conduit of the metal conduit raceway, the condulet formed integrally as one piece, the condulet comprising:
    a condulet body; and
    a mouth comprising:
      a mouth wall extending from the condulet body; and
      an interior ridge positioned circumferentially along an interior of the mouth wall and projecting from the interior of the mouth wall, the interior ridge formed integrally with the mouth wall and configured to form indentations on an exterior of the metal conduit and engage the metal conduit at the indentations when the mouth is compressed with the metal conduit received therein; and a gasket sized to circumscribe the metal conduit and comprising: a ring body forming at least part of a circle and having a first side and a second side opposite the first side, the first side facing a center of the circle; and
      a first lip positioned on the first side and extending circumferentially along the ring body, wherein the gasket deforms and seals a gap between the interior of the mouth wall and the exterior of the metal conduit when the mouth is compressed with the metal conduit received therein.

15. The condulet assembly of claim 14, wherein the gasket is integrally formed as one piece.

16. The condulet assembly of claim 14, wherein the gasket includes a plurality of first lips formed on the first side.

17. The condulet assembly of claim 14, wherein the gasket further includes one or more second lips formed on the second side and extending from the ring body, and the mouth of the condulet further comprising one or more corresponding grooves formed circumferentially along the interior of the mouth wall and sized to receive the one or more second lips therein.

18. The condulet assembly of claim 14, wherein the mouth of the condulet includes a plurality of interior ridges.

19. The condulet assembly of claim 18, wherein the mouth of the condulet further includes a plurality of longitudinal grooves and a plurality of longitudinal projections extending between two of the plurality of interior ridges.

20. The condulet assembly of claim 14, wherein the mouth of the condulet further includes an extended conduit guide extending from the interior ridge and forming a rim of the mouth.

21. The condulet assembly of claim 14, wherein the interior ridge includes a plurality of projections and a plurality of recesses and has a wavy outline with the plurality of projections forming a plurality of convex portions of the outline and the plurality of recesses forming a plurality of concave portions of the outline, the mouth of the condulet further includes a plurality of longitudinal grooves and a plurality of longitudinal projections, wherein at least one of the plurality of longitudinal projections aligns with one of the concave portions of the interior ridge.

22. The condulet assembly of claim 21, wherein longitudinal projections that align with a concave portion of the interior ridge have an outer diameter greater than longitudinal projections that do not align with the concave portion of the interior ridge.

23. The condulet assembly of claim 21, wherein longitudinal projections that align with a concave portion of the interior ridge have an outer diameter smaller than longitudinal projections that do not align with the concave portion of the interior ridge.

* * * * *